(12) United States Patent
Thiebeauld de la Crouee et al.

(10) Patent No.: US 8,555,390 B2
(45) Date of Patent: Oct. 8, 2013

(54) METHOD AND DEVICE FOR PROTECTION OF A MICROCIRCUIT AGAINST ATTACKS

(75) Inventors: Hugues Thiebeauld de la Crouee, Pessac (FR); Oliver Chamley, Leognan (FR)

(73) Assignee: Oberthur Technologies, Colombes (FR)

( * ) Notice: Subject to any disclaimer, the term of this patent is extended or adjusted under 35 U.S.C. 154(b) by 499 days.

(21) Appl. No.: 12/556,897

(22) Filed: Sep. 10, 2009

(65) Prior Publication Data
US 2010/0064370 A1    Mar. 11, 2010

(30) Foreign Application Priority Data
Sep. 11, 2008   (FR) ...................................... 08 56116

(51) Int. Cl.
*G06F 21/00*   (2013.01)
(52) U.S. Cl.
USPC .......................................................... 726/24
(58) Field of Classification Search
USPC .................. 713/194; 726/36, 22–25
See application file for complete search history.

(56) References Cited

U.S. PATENT DOCUMENTS

| | | | | |
|---|---|---|---|---|
| 4,813,024 A | * | 3/1989 | Lisimaque et al. | 365/185.04 |
| 5,533,123 A | * | 7/1996 | Force et al. | 713/189 |
| 2002/0046351 A1 | * | 4/2002 | Takemori et al. | 713/201 |
| 2006/0048230 A1 | * | 3/2006 | Hameau et al. | 726/26 |
| 2006/0117383 A1 | * | 6/2006 | Noh et al. | 726/20 |
| 2009/0106563 A1 | * | 4/2009 | Cherpantier | 713/194 |
| 2010/0077225 A1 | * | 3/2010 | Salgado et al. | 713/189 |

FOREIGN PATENT DOCUMENTS

FR   2 878 633   6/2006

OTHER PUBLICATIONS

Paul Kocher et al., "Differential Power Analysis", Advanced in Cryptology, Crypto '99. 19th Annual International Cryptology Conference, Santa Barbara, CA, Aug. 15-19, 1999, Proceedings; [Lecture Notes in Computer Science; vol. 1666], Berlin Springer, DE, vol. Conf. 19, Jan. 1, 1999, XP000863414, ISBN: 978-3-540-66347-8, pp. 388-397.

* cited by examiner

*Primary Examiner* — Carl Colin
*Assistant Examiner* — Mohammad A Siddiqi
(74) *Attorney, Agent, or Firm* — Young & Thompson

(57) ABSTRACT

The method of protection of a microcircuit against an attack includes:
  a step (205) of determining if an attack has been detected,
  if an attack has been detected, a step (210, 510) of executing a protection function, and
  if no attack has been detected, a step (215, 515) of executing a decoy function simulating the protection function and perceptible from outside the microcircuit in a manner substantially identical to the protection function. In some embodiments the decoy function has a power consumption substantially identical to that of the protection function, the protection function effects a step of writing predetermined data at a first address of a non-volatile memory, and the decoy function effects a step of writing in non-volatile memory at a second address different from the first address.

20 Claims, 3 Drawing Sheets

METHOD AND DEVICE FOR PROTECTION OF A MICROCIRCUIT AGAINST ATTACKS

The present invention concerns a method and a device for protection of a microcircuit against attacks. It particularly applies to the protection of smart cards against side channel attacks with power analysis.

BACKGROUND OF THE INVENTION

To protect the data and programs that they store, microprocessor cards can use a "kill-card" flag. If the card detects an event that it considers to be an attack, it sets this flag irreversibly to a given value and this flag having this value prevents subsequent operation of the microprocessor. This flag is stored in non-volatile memory and setting the flag to the given value involves effecting a write operation in non-volatile memory (by the execution of a so-called "Killcard" function).

Sophisticated attacks are based on an analysis of execution in order to detect the execution of a protection, or countermeasure, function launched by a microcircuit in order to interfere with the execution of that protection function by a physical action on the microcircuit (by interfering with the clock frequency supplied to the microcircuit, by laser action on an area of the circuit, etc.) or to prevent the execution of this protection function (for example by cutting off the power supply of the microcircuit). Thus detection of execution of the protection function is a precursor to interfering with it or inhibiting it. This enables the attacker to succeed in their attack by rendering the protection function inoperative or weakening it.

Some of these sophisticated attacks use power analysis to determine the operation of the microprocessor. In particular, write operations in non-volatile memory impose a very much greater power consumption than arithmetic operations in random-access memory. Power analysis therefore exploits the fact that different operations consume different amounts of electricity. These different operations thus have different signatures in terms of power consumption. The fact that a write operation in non-volatile memory is very distinctive, because of its high power consumption, enables the attack to prevent the flag taking the given value that prohibits subsequent use of the microprocessor. As soon as the signature of this write operation is detected by the attack, the power supply of the microprocessor is cut off and the write operation is not completed.

SUMMARY OF THE INVENTION

The present invention aims to remedy these drawbacks.

To this end, a first aspect of the present invention is directed to a method of protection of a microcircuit against an attack, characterized in that it includes:

a step of determining if an attack has been detected, if an attack has been detected, a step of executing a protection function, and if no attack has been detected, a step of executing a decoy function simulating the protection function and perceptible from outside said microcircuit in a manner substantially identical to the protection function.

Thus an attacker cannot determine whether their attack has been detected by perceiving the execution of the protection function since even if the attack has not been detected the decoy function simulates the execution of the protection function.

It is seen that the simulation of the protection function by the decoy function is preferably executed until it is no longer possible for an attacker to exploit detection of execution of the protection function to complete their attack successfully. Thus the decoy function preferably has a duration greater than or equal to that of the protection function or to the time taken by the protection function to prohibit normal operation of the microcircuit, after which time the decoy function can be perceived without this preventing protection of the microcircuit.

It is seen that a physical magnitude perceptible outside the microcircuit and modulated by the protection function and by the decoy function can be radiation or an electromagnetic field, a resistance, a capacitance, an inductance, a voltage, a current or a power consumption, for example.

According to particular features, following a step of determining if an attack has been detected, the protection function is not executed if the decoy function is executed.

According to particular features, the decoy function has a power consumption substantially identical to that of the protection function.

Accordingly, if the power consumption resulting from the execution of the protection function is perceptible from outside the microcircuit, then during normal operation of the circuit a decoy function is executed having the same power consumption signature. Thus the attacker can no longer distinguish, on the basis of the power consumption of the microcircuit, between execution of a protection function and normal operation of the microcircuit.

As mentioned above, if the attacker blocks the power supply of the microcircuit each time that the decoy function is triggered, they can no longer analyze the operation of the microcircuit. The attack thus becomes ineffective and the microcircuit is protected against this type of attack. Note that, in this type of attack, if the attacker does not cut off the power supply when they detect the power consumption of the decoy function, in order to continue observation of the operation of the microcircuit after the execution of a decoy function, they necessarily allow the protection function to be executed as soon as their attack has been detected.

According to particular features, the protection function is a function that disables the microcircuit, preferably by writing data in non-volatile memory. For example, the protection function is a "Killcard" function described above.

According to particular features, the protection function effects a step of writing predetermined data at a first address of a non-volatile memory.

Thus executing a decoy function having the same power consumption signature as the "Killcard" function during normal operation of the microcircuit, even in the absence of detection of an attack, renders the attack ineffective.

According to particular features, the decoy function effects a step of writing in non-volatile memory at a second address different from the first address.

According to particular features, during the step of writing at the second address by the decoy function, the same number of bits is written as during writing at the first address by the protection function, and the same writing algorithm is used as for writing at the first address by the protection function.

According to particular features, during the step of the decoy function writing at the second address, said predetermined data is written at said second address.

According to particular features, during the step of execution of the decoy function, data different from said predetermined data is written in non-volatile memory at the first address.

Each of the above particular features strengthens the similarity of the signatures of the protection function and the decoy function in terms of power consumption.

According to particular features, said steps of writing in non-volatile memory use a different algorithm to other steps of writing in non-volatile memory effected during normal operation of the microcircuit.

Note that the algorithm can be different in terms of software or hardware, the latter option applying when the cells of the memory are of different kinds.

According to particular features, during at least some of said steps of writing in non-volatile memory, verification data is not used. In particular no checksum is used.

According to particular features, during at least some of said steps of writing in non-volatile memory, the data written is not reread.

According to particular features, during at least some of said steps of writing in non-volatile memory, the writing area is not erased.

Thanks to each of these provisions, the writing steps are accelerated and the risk thus reduced of the attack having time to cut off the power supply before the end of the "Killcard" function, without the signatures of the different functions being different. Moreover, the operation of the microcircuit is accelerated since the execution times of some write functions are reduced. Finally, wear of the memory cells concerned by the decoy function is reduced by reducing the number of write/read cycles.

According to particular features, if the rewriting of data in non-volatile memory is perceptible from outside said microcircuit, in exactly the same way as the initial writing of said data, the decoy function does not erase the writing area. In this case, the protection function, which imposes a write operation, and the decoy function which, apart from its first iteration, can include identical rewrite operations, can have the same signature without the so-called "erase" preliminary phase.

According to particular features, said erasing of the write area is replaced, in each write step from which it is absent, by partial erasing of the write area.

For example, such partial erasing is produced by discharging (or charging, according to the memory architecture) each memory cell affected by the write operation for a time less than that enabling complete discharging (or charging) of the memory cell.

According to particular features, the protection function effects said step of erasing the writing area. Thanks to these provisions, the operation of the microcircuit is accelerated, since the decoy function does not always erase the writing area, whilst guaranteeing correct writing by the protection function on detection of an attack.

According to particular features, some executions of the decoy function include said step of erasing the writing area. This feature applies, in particular, to the case where the write and rewrite signatures are not identical and the protection function includes the preliminary phase of erasing the cells where the write operation is to be effected.

According to particular features, the protection function effects a step of encryption of at least one sensitive item of data.

According to particular features, the decoy function has no function other than simulating the protection function.

Thus the decoy function is not functional and has no influence on the operation of the microcircuit outside its execution phase. For example, the decoy function writes data that is never read or encrypts data of no utility for the operation of the microcircuit. Thanks to these provisions, a faster decoy function can be provided, for example, faster writing, for example, with no erasing step and/or no step of verification of written data, unless the decoy function were useful to the operation of the microcircuit.

A second aspect of the present invention is directed to a device for protection of a microcircuit against an attack, characterized in that it includes:
  means for determining if an attack has been detected,
  appropriate control means adapted:
    if an attack has been detected, to execute a protection function, and
    if no attack has been detected, to execute a decoy function simulating the protection function and perceptible from outside said microcircuit in a manner substantially identical to the protection function.

A third aspect of the present invention is directed to a pocket or mobile electronic entity that includes the device of the present invention, as succinctly described above.

For example this electronic entity is a PDA (personal digital assistant), a USB (universal serial bus) key, a memory card, a mobile telephone, an electronic passport or a smart card (i.e. a secure card conforming to the ISO 7816 standard, for example certified according to the common criteria).

The advantages, objects and particular features of this device and this entity being similar to those of the method of the present invention, as succinctly described above, they are not repeated here.

BRIEF DESCRIPTION OF THE DRAWINGS

Other advantages, objects and features of the present invention will emerge from the following description given by way of nonlimiting explanation with reference to the appended drawings, in which.

DETAILED DESCRIPTION OF THE PREFERRED EMBODIMENTS

In the following description, it is considered, by way of example, that the physical magnitude perceptible from outside the microcircuit is the power consumption, because the attacks known at present concern this. However, the present invention is not limited to this type of physical magnitude modulated on the detection of an attack, but, indeed, to the contrary, encompasses all modulated physical magnitudes perceptible from outside a microcircuit, by contact with that microcircuit or connections made to it or remotely.

Thus one modulated physical magnitude to which the present invention relates can be radiation or an electromagnetic field, a resistance, a capacitance, an inductance, a voltage, a current or a power consumption, for example.

If an attack is detected, a protection function protecting the microcircuit is executed by modulating accordingly at least one predetermined physical magnitude perceptible from outside said microcircuit. According to the present invention, during normal operation of the microcircuit, a decoy function is executed simulating the protection function by modulating each of said predetermined physical magnitudes perceptible from outside said microcircuit in a manner substantially identical to the protection function. This simulation of the protection function by the decoy function is preferably executed up to a time at which it is no longer possible for an attacker to exploit detection of execution of the protection function to carry their attack forward successfully. Thus the decoy function preferably has a duration greater than or equal to the time taken by the protection function to prohibit the normal operation of the microcircuit, and the decoy function can be perceptible after this time without this preventing protection of the microcircuit.

Figure 1:
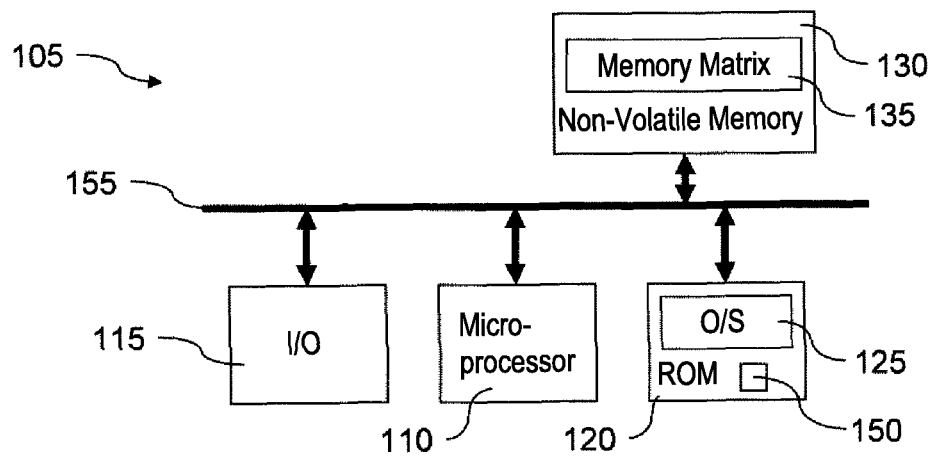
FIG. 1 represents, diagrammatically, one particular embodiment of the device of the present invention.

There is seen, in FIG. 1, a microcircuit card 105 including, interconnected by a bus 155, a microprocessor 110, inputs/outputs 115, a read-only memory 120 storing an operating system 125, and a non-volatile memory 130 including a memory matrix 135 and controlled directly by the microprocessor 110.

Figure 4:
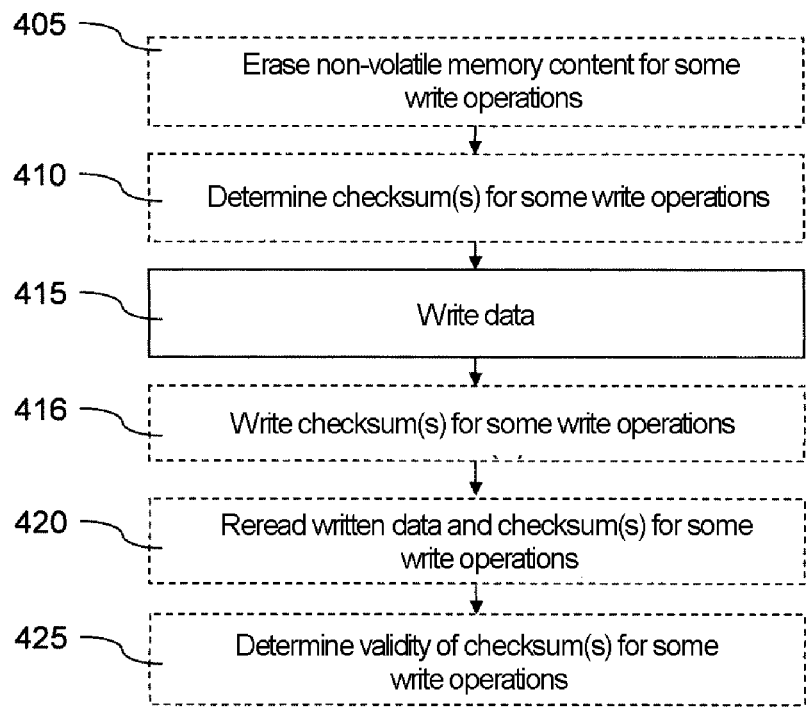
FIG. 4 represents, in the form of a flowchart, steps executed in a preferred variant of the first embodiment of the method of the present invention.

A rapid writing program 150 described with reference to FIG. 4 is stored either in the read-only memory 120, as shown in FIG. 1, or in the non-volatile memory 130, or is hardwired in the microprocessor 110. Alternatively, the program 150 is implemented directly by the operating system 125 stored in the read-only memory 120.

The read-only memory 120 or the non-volatile memory 130 stores instructions of an operating program of the card 105. This program executes in particular the steps of the particular embodiment of the method shown in FIG. 2.

Figure 2:
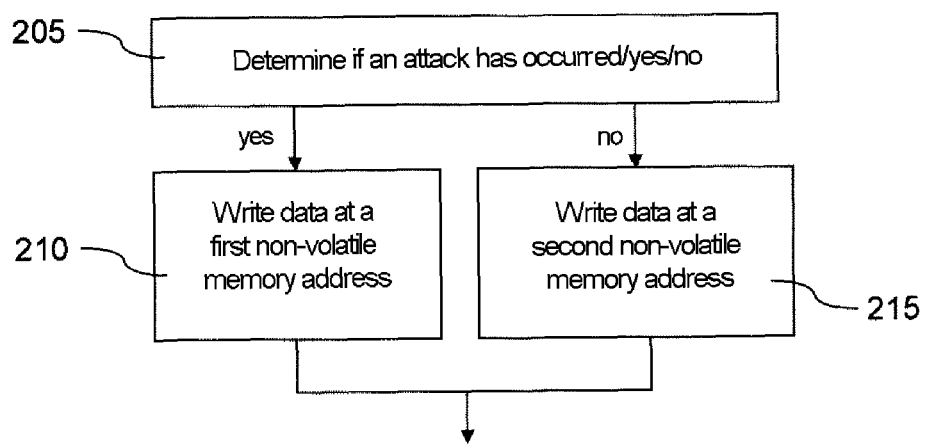
FIG. 2 represents, in the form of a flowchart, steps executed in a first particular embodiment of the method of the present invention.
Figure 5:
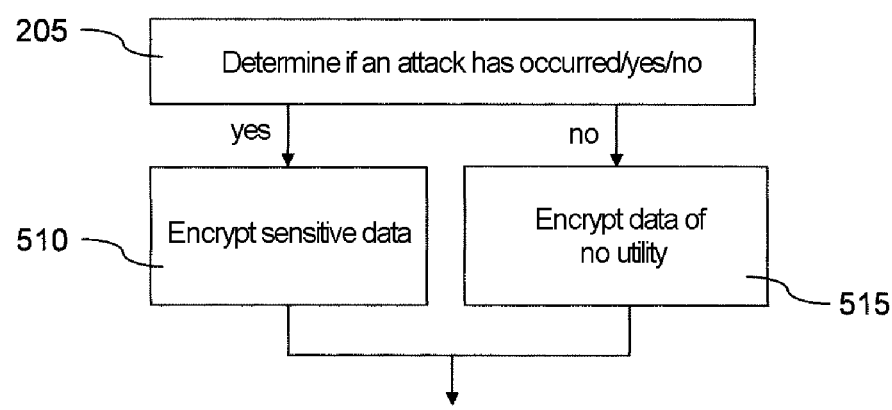
FIG. 5 represents, in the form of a flowchart, steps executed in a second particular embodiment of the method of the present invention.

As shown in FIGS. 2 and 5, the method of the present invention is executed each time that the operation of the microcircuit card 105 includes a step 205 of determining if an attack is taking place, using techniques known in the art.

If an attack is detected, a protection function is executed to protect the card and/or its content.

According to the present invention, even if no attack is detected, a decoy function is executed simulating the protection function and perceptible, from outside said microcircuit, in a manner substantially identical to the protection function.

In simple embodiments, the decoy function is identical to the protection function except for a parameter or variable value, and those values have the same number of bits and where appropriate the same number of bits at "0".

As shown in FIG. 2, in some embodiments, the protection function consists, in a step 210, of writing predetermined data at a first address of a non-volatile memory. This is a matter, for example, of setting to a predetermined value a "Killflag" by writing predetermined data at a first address of the non-volatile memory corresponding to that flag.

In these embodiments, according to the present invention, even if no attack is detected, a step 215 is executed of executing a function having the same signature, in terms of power consumption, as the step of writing predetermined data at the first address of the non-volatile memory.

In simple embodiments, during the step of execution of the decoy function, the non-volatile memory is written at a second address different from the first address.

For the signatures to be as similar as possible, during the step of writing at the second address, the same number of bits is written as in the predetermined data and the same writing protocol is used as when writing the predetermined data. During the step of writing at the second address, the predetermined data is preferably written at the second address.

For example, if the function "Killcard(address1)" is used on detection of an attack, the function "Killcard(address2)" is executed if no attack is detected.

A corresponding code or series of instructions is as follows:

```
If attack detected {
    Complete processing of the current APDU;
    Killcard(address1);
}
Else {
    Complete processing of the current APDU
    Killcard(address 2);
}
```

Alternatively, the protection function "killcard1(address1)" is different from the decoy function "killcard2(address2)", the second function being executed, for example, without rereading or verifying verification data, as explained hereinafter.

As shown in FIG. 5, in some embodiments, the protection function consists, during a step 510, of encrypting at least one sensitive object stored in the non-volatile memory using a secret key, writing it in the non-volatile memory and rendering the version in clear of the sensitive object inaccessible, for example by erasing it. Thus once the data has been encrypted, the microcircuit can no longer function normally.

In these embodiments, according to the present invention, even if no attack is detected, during the operation of the microcircuit a step 515 is executed to execute a function having the same signature, in terms of power consumption, as the step of encrypting each sensitive object and writing in non-volatile memory. For example, during the step 515, data is encrypted that is of no utility to the operation of the microcircuit.

Because encryption is reversible, using asymmetrical or symmetrical key, the issuer of the card can decrypt each item of sensitive data encrypted in this way during the step 510, rewrite it in non-volatile memory, and thus render the card operational again.

Alternatively, data is only partially encrypted by the decoy function. The decoy function then does not have as long a duration as the protection function. Even if the attacker can then detect the protection function, of longer duration, and immediately cut off the power supply of the microcircuit, the microcircuit is protected because data necessary for at least its normal operation is erased, even if all of the data that should be erased by the protection function has not been erased.

As described hereinafter with reference to FIG. 4, a variant of this algorithm uses a modified Killcard function so that, on writing at the first or second address, there is no erasing of the writing area, rereading and/or verification of verification data, in particular the checksum. To this end, before executing the write operation, the microprocessor of the card determines if that write operation concerns the address address1 or address2. If so, the simplified write operation (see FIG. 4) is used. If not, the complete write operation (see FIG. 3) is executed. Note that the difference in processing can also result from the architecture of the memory itself.

In variants, during the step of execution of the decoy function, data different from said predetermined data is written in non-volatile memory at the first address, the predetermined data being written at the same address by the protection function.

Figure 3:
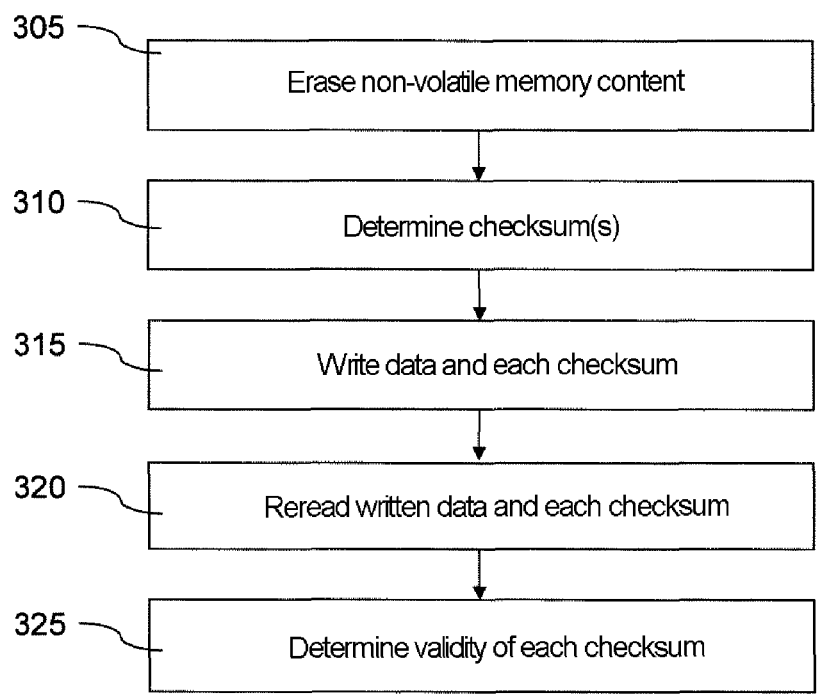
FIG. 3 represents, in the form of a flowchart, steps executed in a normal step of writing a non-volatile memory.

As seen in FIG. 3, a commonly used protocol for writing data in non-volatile memory includes:

a step 305 of erasing the writing area, at least at the address where data must be written; this is called the "erase" step;

a step 310 of determining at least one checksum from the data that must be written;

a step 315 of writing the data and each checksum determined during the step 310;

a step 320 of rereading the data written and each checksum, and a step 325 of determining the validity of the checksum by determining each corresponding checksum in the read data and comparing it with the checksum read.

Note that the step 305 of erasing the write area can consist in leveling the charges of the write area.

Clearly, this writing protocol imposes a very long writing step that wears the memory and slows execution.

Note here that the detection of a checksum error for the address address2 having no consequence, since the data written is never reread, in some embodiments no action is triggered in the event of such detection.

In other embodiments, this detection is considered to be an indication of an attack. If another indication is detected, linked for example to the number of uses of an encryption key or of authentications of the card exceeding a limit value, it is decided that an attack is taking place and the microcircuit protection function is executed.

As seen in FIG. 4, in preferred embodiments of the method of the present invention, the protocol for writing at the second address and where appropriate also at the first address does not include:

the step of erasing the write area; this step can be retained for certain write operations chosen at random or cyclically, during a step 405;

the step of determination of at least one checksum; this step can be retained for certain write operations chosen at random or cyclically, during a step 410;

the step of writing checksum(s); this step can be retained during a step 416 for each checksum determined during a step 410;

the step of rereading the written data; this step can be retained during a step 420 for data leading to the determination of at least one checksum;

the step of determining the validity of the checksums by repeating the determination of each corresponding checksum in the read data; this step can be retained during a step 425 for data leading to the determination of at least one checksum.

Accordingly, in a preferred embodiment, the protocol for writing in non-volatile memory at the first or second address includes only:

the step 415 of writing the data, and for only some data writing operations chosen at random or cyclically, the step 405 of erasing the write area and/or the steps 410, 416, 420 and 425.

Note here that it is possible for the writing effected by the decoy function never to include the erasing of the write area if the write operation, on the one hand, and the retention of the written state, on the other hand, have the same signature. If these signatures are different, when the decoy function is repeated without erasing the write area, it retains the same cells of the non-volatile memory in the written state, which would involve a different signature of the protection function which, by definition, corresponds to a change of state of cells of the non-volatile memory. Accordingly, if these signatures are different, at least some of the decoy functions (for example selected cyclically or at random) include erasing the write area.

Alternatively, instead of eliminating completely the erasing of the write area, there is partial erasure. Such partial erasure can consist in discharging (or charging, depending on the architectures) each memory cell affected by the write operation for a duration less than that for completely discharging (or charging) the memory cell.

In some embodiments, the writing in non-volatile memory effected by the protection function includes generating, writing, rereading and verifying checksums whereas the writing in non-volatile memory effected by the decoy function does not include these. Alternatively, as explained hereinafter, only some write operations (selected cyclically or at random) effected by the decoy function include generating, writing, rereading and verifying checksum(s). In the latter two cases, wear of the memory is reduced, the speed of normal operation of the microcircuit is increased, at the same time as preventing an attacker from recognizing the execution of the protection function.

Consequently, the write finalization delay is very short, compared to the prior art, because there is no erasing of the write area and/or no use of checksum(s). This avoids excessive slowing of the operation of the microcircuit through the repeated execution of the decoy function. Moreover, wear of the memory by the write operations executed by the decoy function is reduced. The memory cells used by the decoy function could age fairly quickly since the memories have a limited lifetime in terms of number of write cycles. By eliminating the step of rereading the written data and the step of erasing the writing area, not only is the writing time reduced but also the lifetime of the memory cells used by the decoy function is extended.

Note also that, if aging of the cell causes errors detectable by using a checksum, the latter checksum can be used to detect this deterioration. In this case, the operating program can automatically switch writing by the decoy function to another, unused cell.

Note that the present invention can be implemented in the form of a program executed in the microcircuit or in the form of a dedicated integrated circuit, for example an ASIC (application-specific integrated circuit), a programmable logic circuit or a logic integrated circuit that can be reprogrammed after its fabrication.

When a microcircuit card implements the preferred embodiment of the method of the present invention, the attacker analyzing the power consumption cannot determine in which case the card is acting after detection of an attack.

In some embodiments, a pocket or mobile electronic entity includes a microcircuit protection device that uses the protection method of the present invention.

For example this electronic entity is a PDA (personal digital assistant), a USB (universal serial bus) key, a memory card, a mobile telephone, an electronic passport or a smart card (i.e. a secure card conforming to the ISO 7816 standard, for example certified according to the common criteria).

Note that the decoy function preferably has no other effect/result/function than acting as a decoy for the protection function, being perceptible from outside the microcircuit in substantially exactly the same way as the protection function.

Thus the decoy function is not functional and does not influence the operation of the microcircuit outside the phase of execution of this decoy function. For example, the decoy function writes data that is never read or used or encrypts data that is of no utility to the operation of the microcircuit. Thanks to this preferred feature, a faster decoy function can be provided, for example faster writing, for example, with no step of erasing and/or no step of verifying written data, unless the decoy function were to be useful to the operation of the microcircuit.

The invention claimed is:

1. A method for protecting a microcircuit against an attack, the method executed by a microprocessor in response to instructions, stored in a non-transitory storage medium readable by said microprocessor, the instructions, upon execution by the microprocessor, causing the microprocessor to carry out method steps, comprising:
 determining whether an attack has been detected; and
 upon completion of said determining step: i) if and only if the attack was detected in the determining step, executing a protection function, and ii) if and only if the attack was not detected in the determining step, executing a decoy function,
 said decoy function configured to simulate the protection function and perceptible from outside said microcircuit in a manner substantially identical to the protection function.

2. The method according to claim 1, wherein the decoy function has a power consumption substantially identical to that of the protection function.

3. The method according to claim 2, wherein the protection function effects a step of writing predetermined data at a first address of a non-volatile memory.

4. The method according to claim 3, wherein the decoy function effects a step of writing in non-volatile memory at a second address different from the first address.

5. The method according to claim 4, wherein, during the step of writing at the second address by the decoy function, the same number of bits is written as during the writing at the first address by the protection function, and the same writing algorithm is used as for writing at the first address by the protection function.

6. The method according to claim 4, wherein said steps of writing in non-volatile memory use a different algorithm to other steps of writing in non-volatile memory effected during normal operation of the microcircuit.

7. The method according to claim 4, wherein, during at least one of said steps of writing in non-volatile memory, verification data is not used.

8. The method according to claim 1, wherein the protection function effects a step of writing predetermined data at a first address of a non-volatile memory.

9. The method according to claim 8, wherein the decoy function effects a step of writing in non-volatile memory at a second address different from the first address.

10. The method according to claim 9, wherein, during the step of writing at the second address by the decoy function, the same number of bits is written as during writing at the first address by the protection function, and the same writing algorithm is used as for writing at the first address by the protection function.

11. The method according to claim 9, wherein said steps of writing in non-volatile memory use a different algorithm to the other steps of writing in non-volatile memory effected during normal operation of the microcircuit.

12. The method according to claim 9, wherein, during at least one of said steps of writing in non-volatile memory, verification data is not used.

13. The method according to claim 9, wherein, during at least one of said steps of writing in non-volatile memory, the written data is not reread.

14. The method according to claim 9, wherein, during at least one of said steps of writing in non-volatile memory, erasing of the write area is not effected.

15. The method according to claim 14, wherein, if the rewriting of data in non-volatile memory is perceptible from outside said microcircuit, in identical manner to the initial writing of said data, the decoy function does not include erasing the writing area.

16. The method according to claim 14, wherein the protection function uses said step of erasing the writing area.

17. The method according to claim 16, wherein some executions of the decoy function include said step of erasing the writing area.

18. The method according to claim 1, wherein the protection function effects a step of encryption of at least one sensitive item of data.

19. The method according to claim 1, wherein the decoy function has no function other than simulating the protection function.

20. A device for protection of a microcircuit against an attack, comprising:
 a microprocessor, in connection with a non-transitory storage medium having stored thereon software instructions executable by the microprocessor, the instructions, upon execution by the microprocessor, configured to cause the microprocessor to
 i) perform a step of determining whether an attack has been detected; and
 ii) upon completion of said determining step: a) if and only if the attack was detected in the determining step, executing a protection function, and b) if and only if the attack was not detected in the determining step, executing a decoy function,
 said decoy function simulating the protection function and perceptible from outside said microcircuit in a manner substantially identical to the protection function.

* * * * *